(12) United States Patent
Singal et al.

(10) Patent No.: US 10,386,994 B2
(45) Date of Patent: Aug. 20, 2019

(54) CONTROL OF ITEM ARRANGEMENT IN A USER INTERFACE

(71) Applicant: Microsoft Technology Licensing, LLC, Redmond, WA (US)

(72) Inventors: Poorva Singal, Redmond, WA (US); Matthew Neil Akers, Lynnwood, WA (US); Brian Eric Uphoff, Seattle, WA (US)

(73) Assignee: Microsoft Technology Licensing, LLC, Redmond ( * ) Notice: Subject to any disclaimer, the term of this patent is extended or adjusted under 35 U.S.C. 154(b) by 730 days.

(21) Appl. No.: 14/624,406

(22) Filed: Feb. 17, 2015

(65) Prior Publication Data

US 2016/0239163 A1  Aug. 18, 2016

(51) Int. Cl.
| | | |
|---|---|---|
| *G06F 3/0482* | (2013.01) | |
| *G06F 3/0481* | (2013.01) | |
| *H04L 29/08* | (2006.01) | |
| *H04M 1/725* | (2006.01) | |
| *G06F 3/0488* | (2013.01) | |

(52) U.S. Cl.
CPC ........ *G06F 3/0482* (2013.01); *G06F 3/04817* (2013.01); *G06F 3/04886* (2013.01); *H04L 67/02* (2013.01); *H04M 1/72586* (2013.01); *G06F 2200/1614* (2013.01); *Y10S 715/977* (2013.01)

(58) Field of Classification Search
None
See application file for complete search history.

(56) References Cited

U.S. PATENT DOCUMENTS

| | | |
|---|---|---|
| 7,216,304 B1 | 5/2007 | Gourdol et al. |
| 7,657,842 B2 | 2/2010 | Matthews et al. |

(Continued)

OTHER PUBLICATIONS

"International Search Report and Written Opinion Issued in PCT Application No. PCT/US2016/016036", foreign counterpart application to U.S. Appl. No. 14/624,406, dated Apr. 18, 2016, 14 Pages.

(Continued)

*Primary Examiner* — Christopher J Fibbi

(57) ABSTRACT

Techniques to control arrangement of items in a user interface is described. In one or more implementations, intuitive rearrangement of items in a user interface is caused by a computing device. A priority ordering of items, one to another, is determined that is specified for display of the items in a first layout in a user interface of the computing device. The items are assigned into respective ones of a plurality of groups that together compose one or more linear arrangements of the groups. Arrangement of the items is controlled by the computing device for display in a second layout in the user interface that is different from the first layout by an amount of display area available in the user interface along one or more dimensions. The control includes following the priority ordering of the items to select positions of the items within respective groups based on availability of an open area that is available to fit a display of a respective item within the group and that minimizes a display area consumed by the group in the user interface.

20 Claims, 18 Drawing Sheets

(56) References Cited

U.S. PATENT DOCUMENTS

| | | | |
|---|---|---|---|
| 7,770,109 B2* | 8/2010 | Fortes | G06F 17/211 |
| | | | 715/209 |
| 8,479,113 B2 | 5/2013 | Fujioka et al. | |
| 2006/0112354 A1 | 5/2006 | Park et al. | |
| 2007/0082707 A1 | 4/2007 | Flynt et al. | |
| 2007/0214431 A1* | 9/2007 | Amadio | G06F 9/451 |
| | | | 715/788 |
| 2007/0266335 A1 | 11/2007 | Zielinski et al. | |
| 2009/0303253 A1 | 12/2009 | Flake et al. | |
| 2010/0087230 A1 | 4/2010 | Peh et al. | |
| 2010/0095248 A1* | 4/2010 | Karstens | G06F 3/048 |
| | | | 715/846 |
| 2012/0162266 A1 | 6/2012 | Douglas et al. | |
| 2012/0324400 A1* | 12/2012 | Caliendo, Jr. | G06F 3/0481 |
| | | | 715/835 |
| 2013/0024815 A1* | 1/2013 | O | H04M 1/72586 |
| | | | 715/811 |
| 2013/0057587 A1 | 3/2013 | Leonard et al. | |
| 2013/0067412 A1 | 3/2013 | Leonard et al. | |
| 2013/0132874 A1 | 5/2013 | He et al. | |
| 2013/0305187 A1 | 11/2013 | Phillips et al. | |
| 2014/0013271 A1* | 1/2014 | Moore | G06F 3/0482 |
| | | | 715/792 |
| 2014/0020024 A1* | 1/2014 | Asam | H04N 21/482 |
| | | | 725/41 |
| 2014/0149875 A1 | 5/2014 | Wilder et al. | |
| 2015/0089360 A1* | 3/2015 | Brisebois | G06F 3/04817 |
| | | | 715/702 |
| 2015/0199110 A1* | 7/2015 | Nakazato | G06F 3/0487 |
| | | | 715/763 |

OTHER PUBLICATIONS

"Windows 8 Release Preview", Retrieved From <<https://web.archive.org/web/20120611112618/http://www.microsoft.com/about/mspreview/windows8/Windows8_RP_Product_guide.pdf>>, Jun. 11, 2012, 37 Pages.

"Acer Iconia W700 (FHD IPS Display, Win 8)", Retrieved From <<https://www.youtube.com/watch?v=vsTDdQ1R3zg>>, Jun. 4, 2012, 1 Page.

"HP Elitebook 2760p Windows 8 Auto Rotation", Retrieved from <<https://www.youtube.com/watch?v=gEnFxRDuBz4>>, Oct. 12, 2011, 1 Page.

"Second Written Opinion Issued in PCT Application No. PCT/US2016/016036", dated Aug. 8, 2016, 8 Pages.

"International Preliminary Report on Patentability Issued in PCT Application No. PCT/US2016/016036", dated Apr. 12, 2017, 9 Pages.

PCT Application No. PCT/US2016/016036, foreign counterpart application to U.S. Appl. No. 14/624,406, , Response to the Written Opinion of the International Searching Authority (including amended claims), dated Jun. 29, 2016, 14 Pages.

* cited by examiner

1600 ─╮
      ↘

1602
Determine a priority ordering of items, one to another, that is specified for display of the items in a first layout in a user interface of the computing device, the items assigned into respective ones of a plurality of groups that together compose one or more linear arrangements of the groups

↓

1604
Control arrangement of the items by the computing device for display in a second layout in the user interface that is different from the first layout by an amount of display area available in the user interface along one or more dimensions, the controlling including following the priority ordering of the items to select positions of the items within respective groups based on availability of an open area that is available to fit a display of a respective said item within the group and that minimizes a display area consumed by the group in the user interface

1702
Determine a priority ordering of items, one to another, that is specified for display of the items in a first layout in a user interface of the computing device, the priority ordering of the items performed by assigning the items into respective groups that are based on a predefined distance in the user interface along one or more dimensions

1704
Control arrangement of the items by the computing device for display in a second layout in the user interface that is different from the first layout, the controlling including following the priority ordering of the items to select positions of the items based on availability of an open area that is available to fit a display of a respective said item

*Fig. 17*

CONTROL OF ITEM ARRANGEMENT IN A USER INTERFACE

BACKGROUND

A variety of different items may be arranged in a user interface, such a representations of applications, entries in an ordered list, and so on. For example, representations of applications may be arranged in an application launcher (e.g., start screen start menu, and so forth) by a user as part of a layout such that the user may readily locate desired items of interest.

However, changes may be made to a display area that is available for display of the application launcher, such as to change a mobile device from a portrait to landscape mode, selection of an option to resize the application launcher, change to a difference device (e.g., as part of migrating user settings), and so forth. These changes can cause a corresponding change in the layout such that the representations are rearranged into a new layout.

Conventional techniques that are utilized to perform the rearrangement, however, can lack intuitiveness in that the representations are positioned at unexpected locations within the application launcher, may result in inefficient consumption of an amount of available display area for the application launcher, and so forth.

SUMMARY

Techniques to control arrangement of items in a user interface are described. In one or more implementations, intuitive rearrangement of items in a user interface is caused by a computing device. A priority ordering of items, one to another, is determined that is specified for display of the items in a first layout in a user interface of the computing device. The items are assigned into respective ones of a plurality of groups that together compose one or more linear arrangements of the groups. Arrangement of the items is controlled by the computing device for display in a second layout in the user interface that is different from the first layout by an amount of display area available in the user interface along one or more dimensions. The control includes following the priority ordering of the items to select positions of the items within respective groups based on availability of an open area that is available to fit a display of a respective item within the group and that minimizes a display area consumed by the group in the user interface.

In one or more implementations, intuitive rearrangement of items in a user interface is caused by a computing device. A priority ordering of items is determined, one to another, that is specified for display of the items in a first layout in a user interface of the computing device. The priority ordering of the items is performed by assigning the items into respective groups that are based on a predefined distance in the user interface along one or more dimensions. Arrangement of the items is controlled by the computing device for display in a second layout in the user interface that is different from the first layout. The control includes following the priority ordering of the items to select positions of the items based on availability of an open area that is available to fit a display of a respective item.

In one or more implementations, a computing device includes a processing system configured to execute one or more instructions and computer-readable storage media comprising one or more instructions that cause execution of the processing system to implement an operating system that includes an application launcher. The application launcher has a plurality of representations of applications or content that are selectable to navigate to a user interface corresponding with a respective application or content. The operating system is configured to perform operations including determination of a priority ordering of the representations one to another that is specified for display of the representations in a first layout of the application launcher. The operations also include control of arrangement of the items by the computing device for display in a second layout in the application launcher that is different from the first layout by an amount of display area available in the application launcher along one or more dimensions. The control includes following the priority ordering of the representations to select positions of the representations based on availability of an open area in the application launcher that is available to fit a display of a respective item and that minimizes a display area consumed by the representations within the application launcher.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 16 is a flow diagram depicting a procedure in an example implementation in which intuitive rearrangement of items in a user interface is caused by a computing device using an ordered fill technique.

FIG. 17 is a flow diagram depicting a procedure in an example implementation in which in which intuitive rearrangement of items in a user interface is caused by a computing device using a spatial preservation fill technique

DETAILED DESCRIPTION

Overview

Conventional techniques to rearrange items from one layout to another typically lacked intuitiveness and thus often resulted in a layout in which it is difficult for a user to locate an item of interest. Examples of this include rearrangement of representations between layouts due to resizing of an application launcher, change from portrait to landscape view, and so forth.

Control techniques are described that are usable to support intuitive rearrangement of items between layouts. For representations of applications and content within an application launcher, for instance, a situation may be encountered in which an ordered list of the representations is placed in an area of the application launcher that has a given width.

The techniques are usable to take these representations from a first layout and reflow the representations to a second layout that balances a priority order of the representations and minimizes gaps within the application launcher, thus conserving an amount of display area consumed by the representations. In this way, representations are readily located by a user in the different layouts, even in instances of representations having different sizes, in grouping arrangements, and so forth. Further discussion of these and other techniques is described in the following sections and shown in corresponding figures.

In the following discussion, an example environment is first described that may employ the techniques described herein. Although representations of applications and content within an application launcher context are described, a variety of other items may also employ this techniques, such as ordered lists and so forth. Example procedures are then described which may be performed in the example environment as well as other environments. Consequently, performance of the example procedures is not limited to the example environment and the example environment is not limited to performance of the example procedures.

Example Environment

Figure 1:
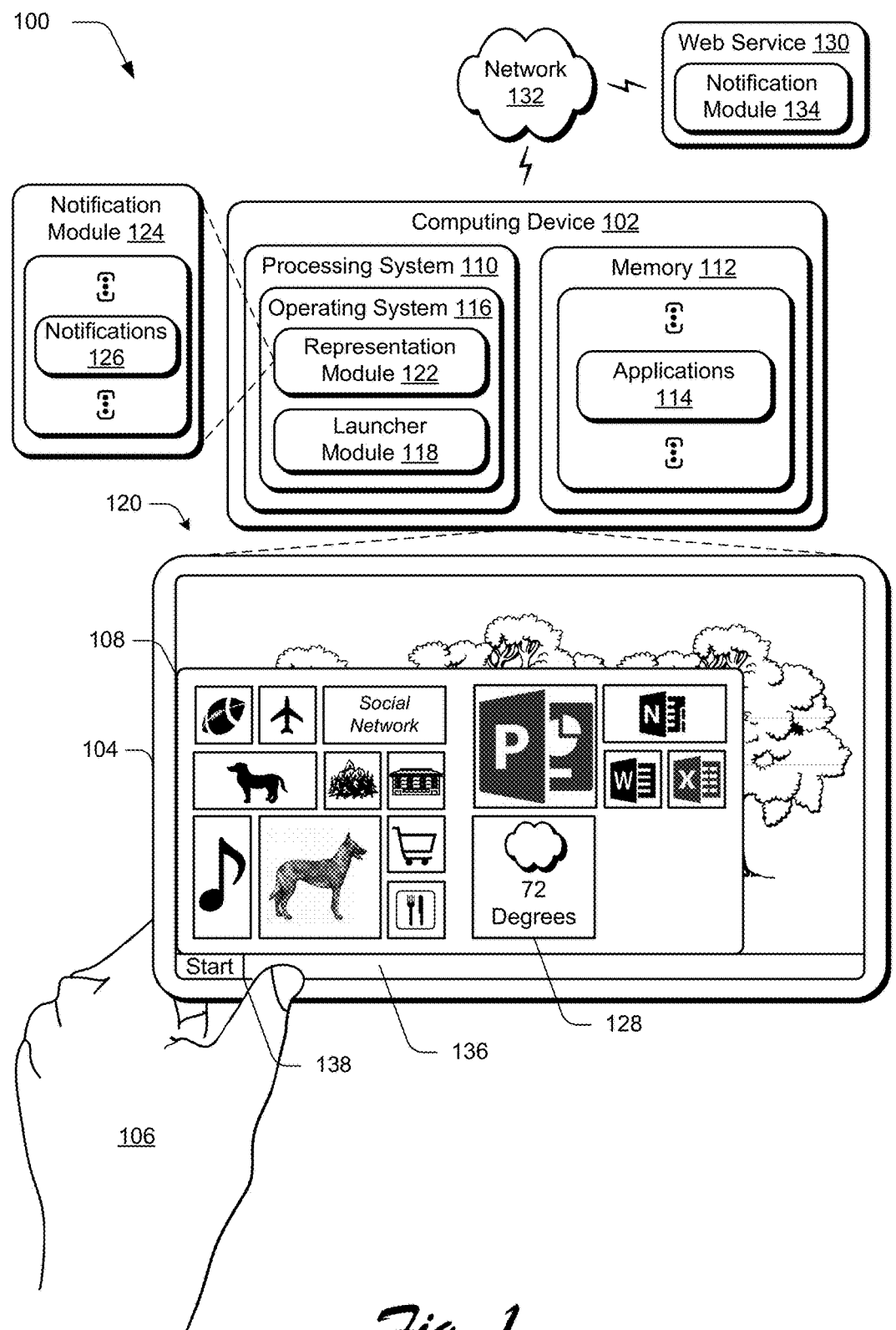
FIG. 1 is an illustration of an environment in an example implementation that is operable to employ the arrangement control techniques described herein.

FIG. 1 is an illustration of an environment 100 in an example implementation that is operable to employ the arrangement control techniques described herein. The illustrated environment 100 includes an example of a computing device 102, which is illustrated as a mobile computing device (e.g., tablet or mobile phone) having a housing 104 that is configured to be held by one or more hands 106 of a user. A variety of other configurations of the computing device 102 are also contemplated.

Figure 8:
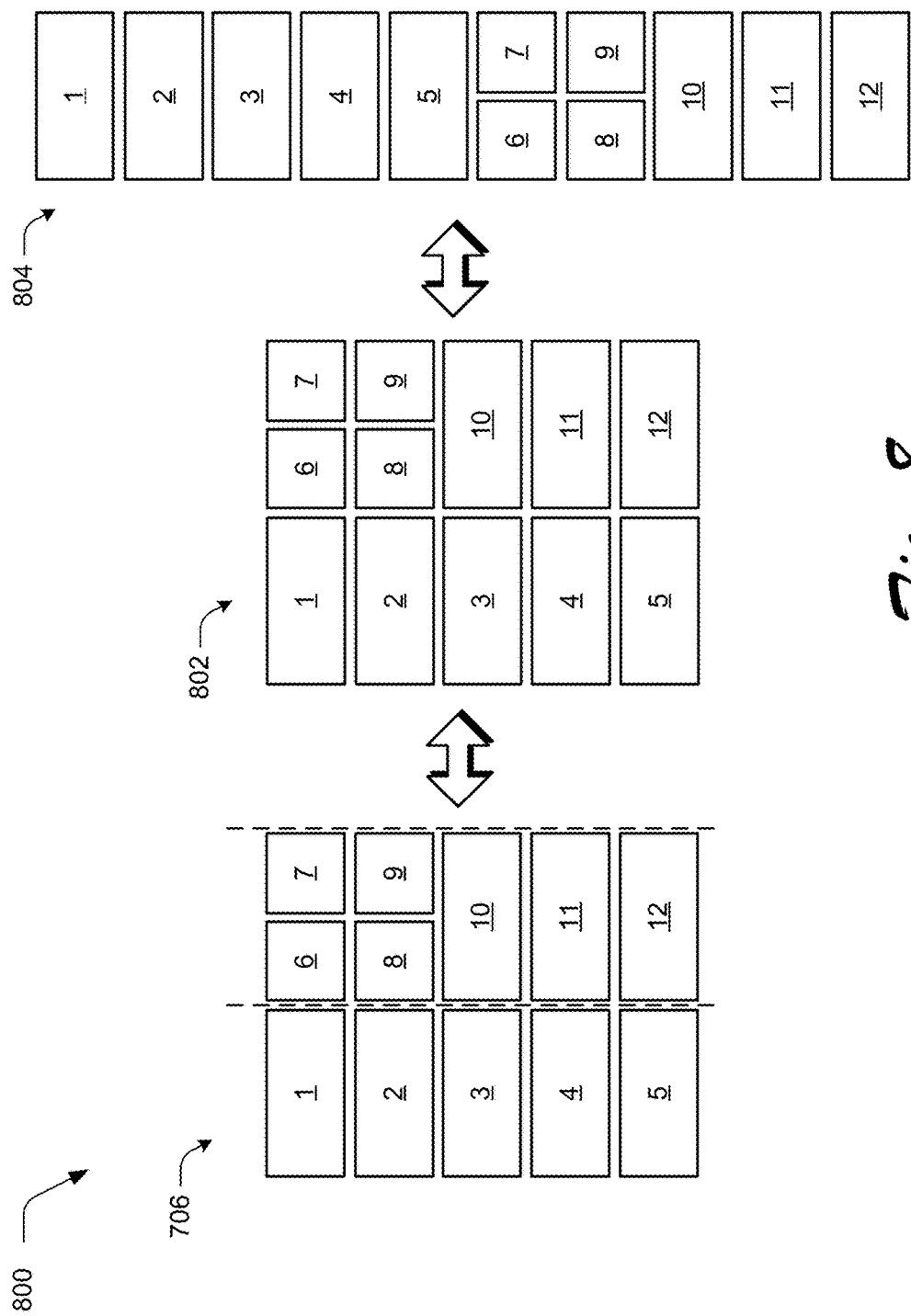

For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIG. 8. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a display device 108, a processing system 110, and an example of computer-readable storage media, which in this instance is memory 112. The memory 112 is configured to maintain applications 114 that are executable by the processing system 110 to perform one or more operations.

The computing device 102 is further illustrated as including an operating system 116. The operating system 116 is configured to abstract underlying functionality of the computing device 102 to applications 114 that are executable on the computing device 102. For example, the operating system 116 may abstract the processing system 110, memory 112, network, input/output, and/or display functionality of the display device 108, and so on such that the applications 114 may be written without knowing "how" this underlying functionality is implemented. The application 114, for instance, may provide data to the operating system 116 to be rendered and displayed by the display device 104 without understanding how this rendering will be performed. The operating system 116 may also represent a variety of other functionality, such as to manage a file system and user interface that is navigable by a user of the computing device 102.

The operating system 116 may be configured to process a variety of different input/output functionality supported by the computing device 102. Thus, the operating system 116 include functionality relating to recognition of inputs and/or provision of outputs by the computing device 102 as well as devices used to detect those inputs. For example, the operating system 116 may be configured to identify gestures and cause operations to be performed that correspond to the gestures, and so on. The inputs may be detected for processing by the operating system 110 in a variety of different ways.

For example, the operating system 110 may be configured to receive one or more inputs via touch interaction with a hardware device, e.g., fingers of the user's hand 106 detected using touchscreen functionality of the display device 108. Recognition of the touch inputs may be leveraged by the operating system 116 to interact with a user interface output by the computing device 102, such as to interact with a game, an application, browse the internet, change one or more settings of the computing device 102, and so forth. A variety of other hardware devices are also contemplated that do not involve touch interaction with the display device 104. Examples of such hardware devices include a cursor control device (e.g., a mouse), a remote control (e.g. a television remote control), a mobile communication device (e.g., a wireless phone configured to control one or more operations of the computing device 102), and other devices.

The operating system 116 may also represent a variety of other functionality, such as to manage a file system and a user interface that is navigable by a user of the computing device 102. An example of this is illustrated as a launcher module 118 that is representative of functionality to implement an application launcher (e.g., start screen or start menu), an example of which is illustrated as a start menu but other configurations are also contemplated, such as a start screen that consumes a majority of a display area of the display device through inclusion of representation directly "on" the user interface, e.g., on a desktop.

The application launcher 120 includes representations of a plurality of the applications 114 or content, such as icon, tiles, textual descriptions, and so on, and may be configured in a variety of ways. The application launcher 120, for instance, may be configured as a root level of a hierarchical file structure, e.g., each of the other levels are "beneath" the root level in the hierarchy. The representations shown in the illustrated example are selectable to launch a corresponding one of applications 114 for execution on the computing device 102. In this way, a user may readily navigate through a file structure and initiate execution of applications 114 of interest. Other configurations are also contemplated, examples of which are discussed in the following and shown in corresponding figures.

The operating system 116 is also illustrated as including a representation module 122. The representation module 122 is representative of functionality to manage representations of applications 114 (e.g., tiles, icons, and so on) and content consumable by the applications 114, examples of which are illustrated for the start menu. In some instance, the representations may include notifications that may be displayed as part of the representations without launching the represented applications 114. This functionality is illustrated as a notification module 124 that is configured to manage notifications 126 for inclusion as part of the representations.

For example, a representation 128 of a weather application is illustrated as including a notification that indicates a name and current weather conditions, e.g., "72°." In this way, a user may readily view information relating to the applications 114 without having to launch and navigate through each of the applications. Although representations of specific applications 114 are shown, other representations of applications are also contemplated, such as a representation of an application that references a user's involvement with a service, e.g., a friend in a social network service.

In one or more implementations, the notifications 126 may be managed without executing the corresponding applications 114. For example, the notification module 124 may receive the notifications 126 from a variety of different sources, such as from software (e.g., other applications executed by the computing device 102), from a web service 130 via a network 132, and so on. This may be performed responsive to registration of the applications 114 with a notification module 134 to specify where and how notifications are to be received. The notification module 124 may then manage how the notifications 126 are displayed as part of the representations without executing the applications 114. This may be used to improve battery life and performance of the computing device 102 by not running each of the applications 114 to output the notifications 126.

Although this discussion describes incorporation of the notification module 124 at the client, functionality of the notification module 124 may be implemented in a variety of ways. For example, functionality of a notification module 124 may be incorporated by the web service 130 in whole or in part. The notification module 134, for instance, may process notifications received from other web services and manage the notifications for distribution to the computing device 102 over the network 132, e.g., through registration of the applications 114 with the notification modules 124, 134 such that the notifications 126 may be output as part of the representations without execution the represented applications 114.

Output of the application launcher 120 is initiated in a variety of ways. In the illustrated example, for instance, a taskbar 136 (e.g., a quick launch bar) is displayed along an edge of a user interface display on the display device 108. The taskbar 136 includes representations of functionality, including a representation 138 of the application launcher 120, e.g., "start." Selection of the representation 138 of the application launcher 120 causes the launcher module 118 to display the application launcher 120 in the user interface.

The taskbar 136 may also be configured to include representations of applications 114 that are currently being executed (e.g., whether actively or in a sleep state) by the computing device 102.

As previously described, the application launcher 120 provides a user with a space in a user interface via which the user curates desired representations of applications and content for quick access. To do so, the launcher module 118 is configured to control a location at which representations are displayed within the application launcher 120 (e.g., pinned), such as when switching between layouts. This control is configured such that the representations may be readily located by a user in an intuitive manner and also creates a visually pleasing layout without requiring user interaction to manually arrange and rearrange the representations and thus increases user efficiency as further described below.

Figure 2:
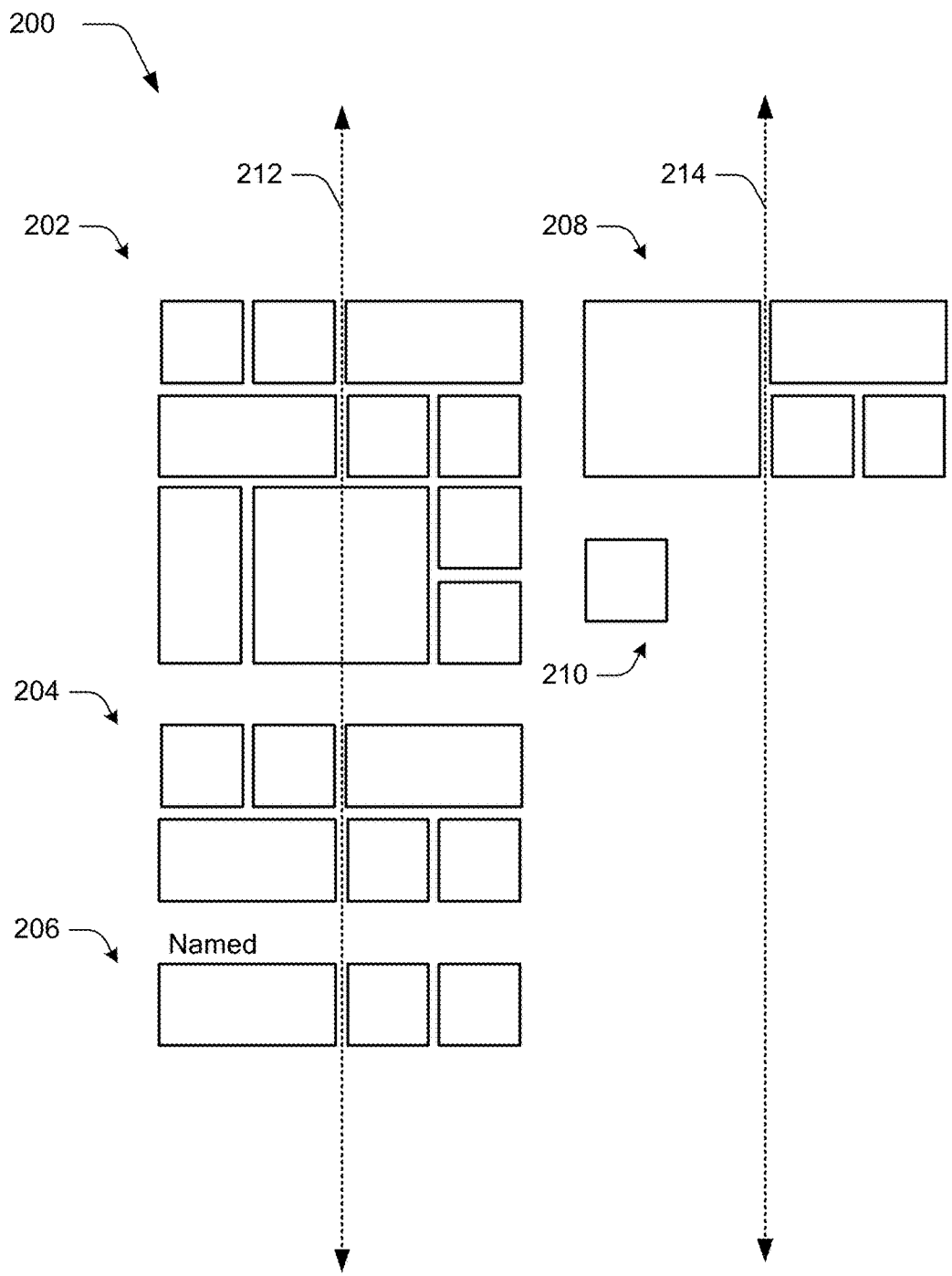
FIG. 2 depicts a user interface of an application launcher having a plurality of grouping of representations of applications and/or content in a plurality of linear arrangements.

As shown in FIG. 2, for instance, a user interface 200 of the application launcher 120 is illustrated having a plurality of groups of representations of applications and/or content. The user interface 200 includes first, second, third, fourth, and fifth groups 202, 204, 206, 208, 210 of representations that are displayable simultaneously in a user interface. In one or more implementations, the groups 202, 204, 206, 208, 210 are visually differentiated from each other, such as through use of a display characteristic (e.g., color, shading), a spacing between the representations within the plurality of groups is less that a spacing between the groups as a whole as illustrated, and so forth.

Additionally, the plurality of groups 202, 204, 206, 208, 210 are arranged to define a plurality of linear arrangements 212, 214. For example, groups 202, 204, 206 together define a first one 212 of the plurality of linear arrangements and groups 208, 210 define a second one 214 of the plurality of linear arrangements. In the illustrated example the plurality of linear arrangements 212, 214 form columns that are generally parallel to each other. An arrangement as rows is also contemplated. The linear arrangements define directions of navigation that is performable through the groups, which is vertical in this example.

Figure 3:
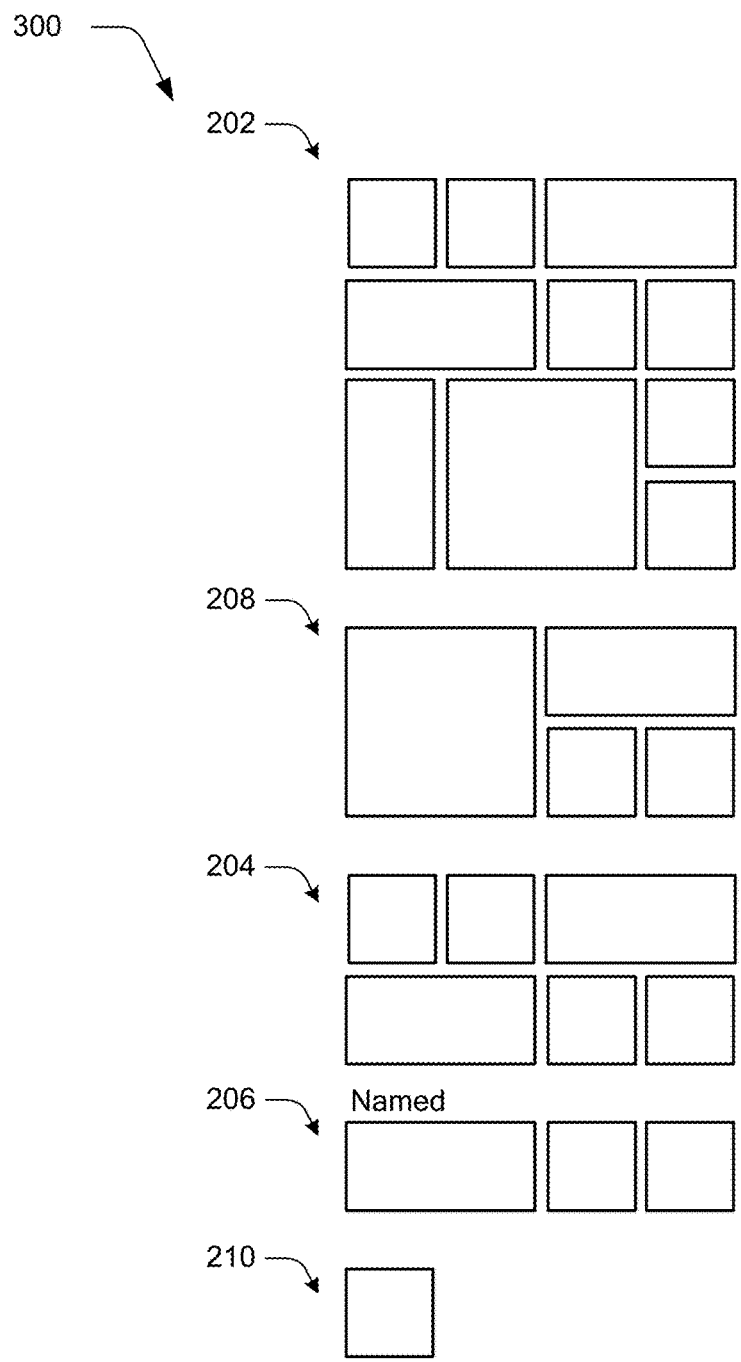
FIG. 3 depicts a user interface of an application launcher having a plurality of grouping of representations of applications and/or content of FIG. 2 rearranged into a single linear arrangement.

The use of groups and linear arrangements, however, introduces complications. For example, the representations in this example are contained in groups of a fixed distance along a first dimension (e.g., width) but undefined along a second dimension, e.g., height. This means each of the groups are of the same width but can have different heights as illustrated in FIG. 2. To add to that complexity, the number of groups and columns of representations within the groups can change if the user resizes a display area of the application launcher 120 or rotates the display device 108 as a whole. The user, for instance, may change from a landscape layout of the groups as shown in FIG. 2 to a portrait layout of the groups as shown in an example 300 of a user interface of an application launcher 120 as depicted in FIG. 3. Accordingly, a number of columns usable to represent groups as well as representations within the groups may change between the layouts.

Thus, there are cases where the width within a group as well as a number of groups that are displayable at any one time may change. These also include when a user selects a toggle for representation density, e.g., "show more tiles." If this toggle is selected, each of the groups within the application launcher may become wider to support display of additional representations along this dimension. Likewise, selection of the toggle again (e.g., to turn it off) may cause the application launcher 120 to revert back to a lower density of tiles. In another example, when users restore an application launcher 120 layout, such as to roam user setting to a new computing device, the new computing device may support different width groups than the ones in their restore layout, such as to switch to a larger tablet.

Accordingly, the launcher module 118 is configured to support reflow of items (e.g., representations) to support a predictable and consistent arrangement between different layouts caused by resizing, change in orientation, and so on of the application launcher 120. As previously described, although representations of applications and content within an application launcher 120 context are described, a variety of other items may also employ these techniques, such as ordered lists and so forth. For example, in a cell-based layout in a user interface coordinates of items are known which may then be used to preserve a general spatial relationship of the items, one to another. In another example, in a linked list an order as well as a size and height of items may be known and used to determine and preserve a priority ordering.

Figure 4:
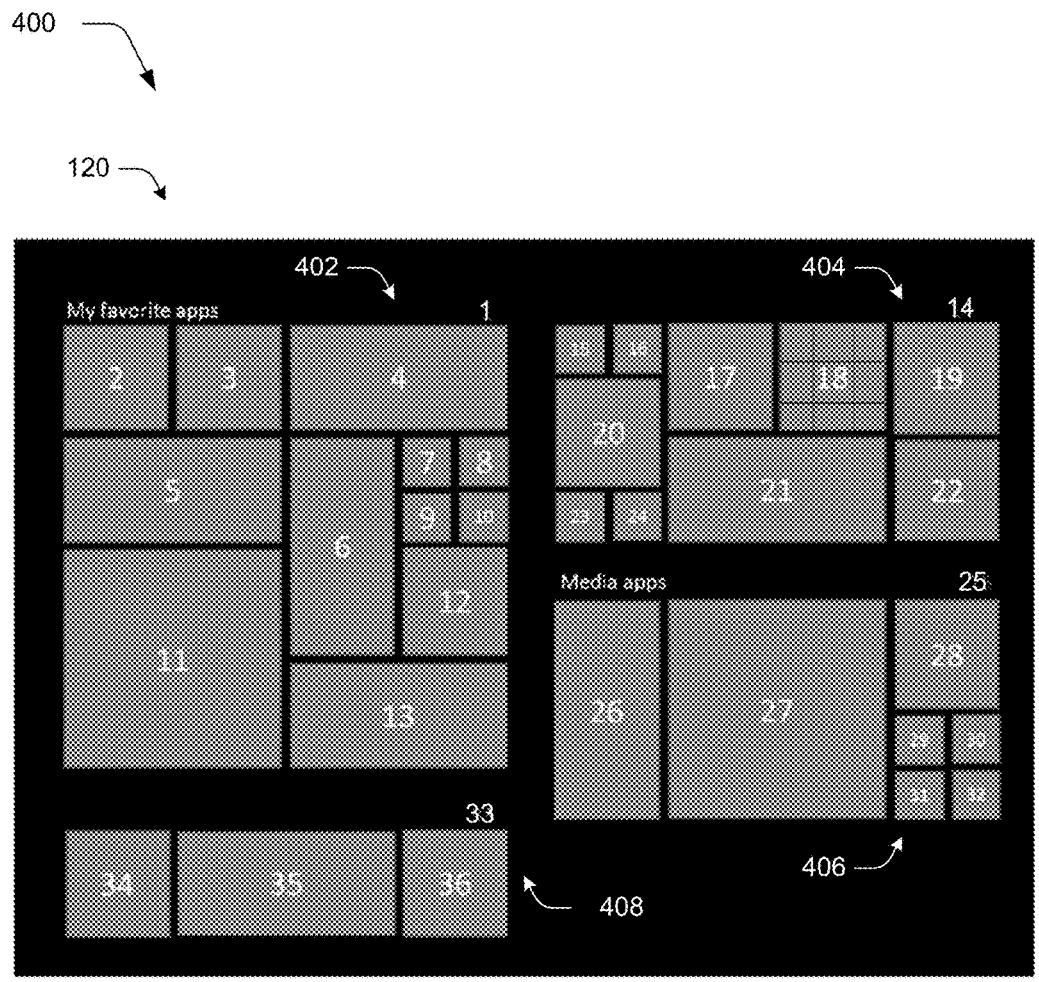
FIG. 4 depicts an example implementation in which the application launcher of FIG. 1 includes representations arranged in a first layout that includes groups.
Figure 5:
FIG. 5 depicts an example implementation in which the application launcher of FIG. 1 includes representations arranged in a second layout from the first layout of FIG. 4.
Figure 6:
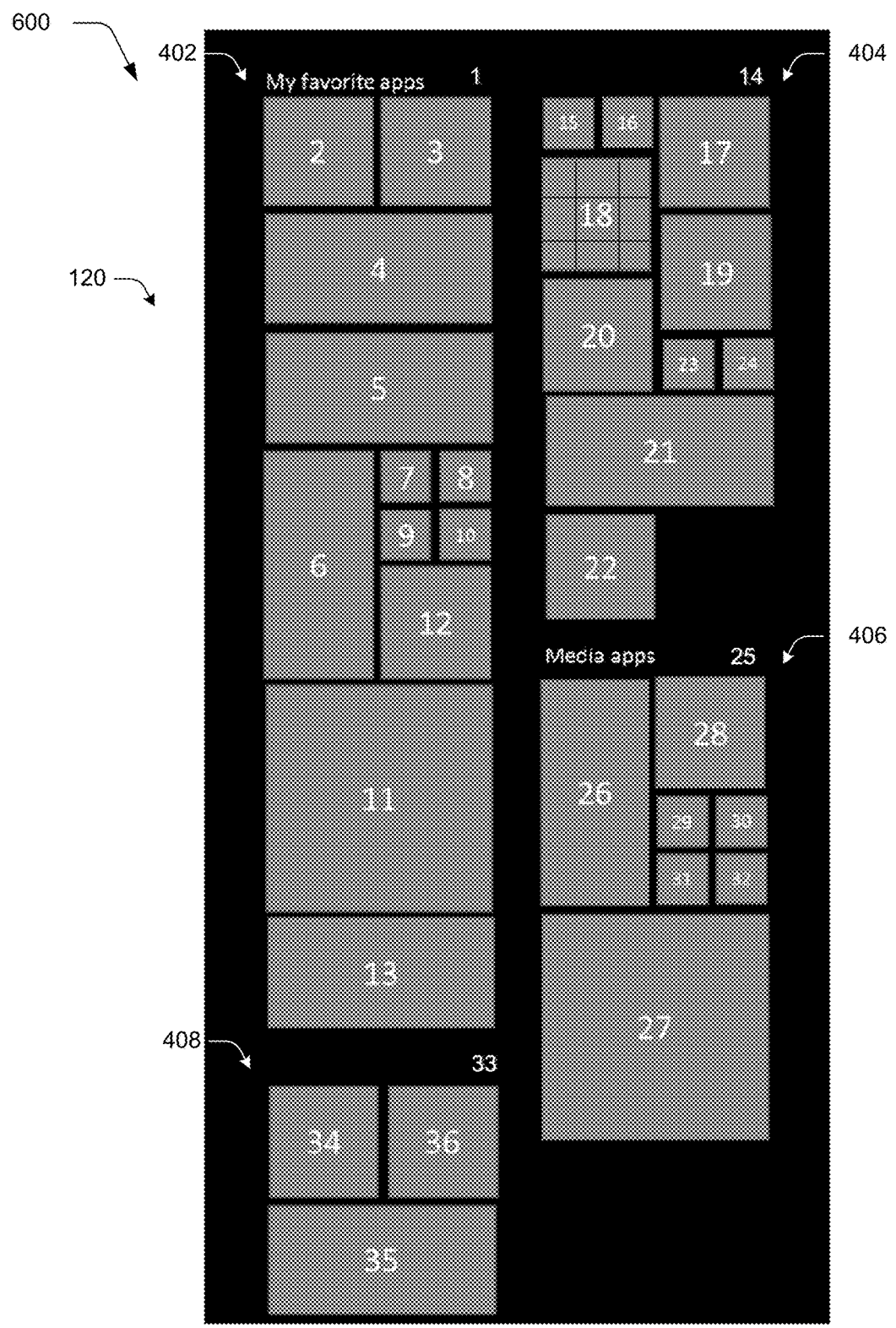
FIG. 6 depicts an example implementation in which the application launcher of FIG. 1 includes representations arranged in a third layout from the first layout of FIG. 4.

FIGS. 4-6 depict example implementations of an ordered fill technique employed by the launcher module 118 of FIG. 1 to control arrangement of representations within an application launcher in different layouts. In the following, representations as arranged in a first layout as shown in FIG. 4 are rearranged for inclusion in a second layout as shown in FIG. 5. Representations in the first layout are also rearranged according to a third layout as shown in FIG. 6. This involves leveraging a priority order of the groups and representations such that even though different layouts are used the representations appear consistent with a user's expectations, thus improving efficiency in user interaction with the user interfaces.

FIG. 4 depicts an example implementation 400 in which the application launcher 120 of FIG. 1 includes representations arranged in a first layout that includes groups. The application launcher 120 includes first, second, third, and fourth groups 402, 404, 406, 408 in this example. As before, groups 402, 408 form a first linear arrangement and groups 404, 406 form a second linear arrangement, e.g., columns in this example.

An example of a priority ordering is illustrated through the use of numbers for groups and representations within the groups. In this example, the priority is based starting from a top of the application launcher 120 followed by starting to the left for the groups and the representations within the groups. A variety of other dimensions, directions, and relationships between the dimensions may also be chosen without departing from the spirit and scope thereof.

Thus, in this example group 402 is assigned a first position in a priority order followed by representations 2, 3, and 4 that are disposed along a matching dimension, e.g., horizontal. A next lower level within the group is then used to specify a priority as 5, 6, 7, and 8. As illustrated, representation 6 is chosen even though it extends to a lower level. Representations 9 and 10 at the next lower level are then taken as the next positions in the priority ordering, followed by representation 11 which starts a new level that includes representation 12, and then ends with representations 13 for the first group 402.

Similar techniques are then used to determine a priority for the second group 404 and representations within the group, and continue on to the third and fourth groups 406, 408 as the representations and corresponding groups are arranged at increasingly lower levels in the application launcher 120. This ordered priority is used as a basis to control rearrangement of the representations into another layout that is different than this layout (e.g., has a different available display area along one or more dimensions), an example of which is described in the following and shown in a corresponding figure.

FIG. 5 depicts an example implementation 500 in which the application launcher 120 of FIG. 1 includes representations rearranged into a second layout from the first layout of FIG. 4. As previously described, a change in layouts may occur responsive to a variety of different changes, such as selection of a toggle to increase or decrease a number of representations, resizing of an available display area of the application launcher 120, and so on.

The first layout of FIG. 4, for instance, includes two linear arrangements of groups in which each group includes four medium sized representations, e.g., square tiles, along a horizontal dimension in the application launcher 120. Thus, each row within the application launcher 120 is configured to include eight of these representations. In the second layout of FIG. 5, however, each of the groups is configured to include two of these medium-sized representations for a total of four such representations along any one row in the application launcher 120. Thus, in this example a change along a horizontal dimension within the application launcher 120 is made between the first and second layouts that causes a difference in the layouts, e.g., an amount of display area available in this dimension.

In response, the launcher module 118 controls arrangements of the representations to support an intuitive and efficient arrangement of the representations, and does so by leveraging the priority ordering of the items (e.g., the representations) as discussed in relation to FIG. 4. For example, the launcher module 118 proceeds through the priority ordering, such as by starting at a first position within the priority order of the items, e.g., starts with group 402 that has the first position and the representation two within group 402 in the priority order.

The launcher module 118 is configured to place the representations in a specified order, such as to mimic dimensions used to specify the priority ordering of the representations in the first layout and thus preserve a spatial relationship of the representations. For example, the launcher module 118 is configured to start at a direction in a first dimension (e.g., vertical) and continue to fill representations along a direction in a second dimension, e.g., horizontal. In the illustrated instance, the launcher module 118 selects the representations according the priority ordering and positions the representations at a first position in a group 402 that has an available display area that corresponds to a display area to be consumed by the representation, i.e., fits the representation.

A topmost row is this example is selected by the launcher module 118 that will fit the representation. In some instances, this may cause placement in a lower level (e.g., by adding a new row) in instances in which the representation does not fit in a gap of a currently available level. If there are multiple columns within the row where a top of the representations may be positioned, a default predefined direction is utilized, e.g., to start at the left in this example. In one or more implementations, open areas that are available to fit a display of a respective item within a group (i.e., gaps) specified in the first layout are filled using such a technique. In other examples, these gaps are also assigned a priority in the list, such as for gaps that could support inclusion of a representation that is positioned lower in the group but do not have one so positioned and thus may be used to maintain the gaps that are likely specified by a user.

In this way, the launcher module 118 maintains representations in a priority order as feasible and also minimizes creation of gaps within the groups. This may cause some representations that were lower in the first layout of FIG. 4 to be positioned higher in the application launcher 120 in this example due to suitability to fill an existing gap.

As shown in the first layout of FIG. 4, for instance, the groups 402-408 support eight medium-sized representations as previously described. When rearranging the representations for display in the second layout of the example implementation 500 of FIG. 5 that supports six medium-sized representations, the representations are rearranged, which the numbers indicating the priority ordering from the first layout.

Note how gaps are minimized by allowing the representations to fill existing holes within the same group, e.g., by moving representation 6 upward in the group 402. This does result in a slight reordering of the representations from the priority ordering determined in the first layout and thus some of the representations are no longer in the same priority order. However, representations that are at the top are kept as near the top when possible and thus is consistent with user expectations.

FIG. 6 depicts an example implementation 600 in which the application launcher 120 of FIG. 1 includes representations arranged into a third layout from the first layout of FIG. 4. In this example, the application launcher 120 supports display of two columns of groups, each supporting display of two medium-sized representations in a single row. In this example, representation 12 is used to fill a gap adjacent to representations 6, 9, and 10 and thus minimizes a display area consumed by the group 420 as a whole in the application launcher. Thus, the ordered fill techniques is used by the launcher module 118 to preserve priority ordering as well as minimize an overall display area consumed by the groups in a user interface (e.g., the application launcher 120) by filling in gaps. Other techniques are also usable by the launcher module 118 to perform this arrangement, an example of which is described as follows and shown in corresponding figures.

FIGS. 7-14 depicts additional example implementations 700, 800, 900, 1000, 1100, 1200, 1300, 1400 of control of item arrangement in a user interface using a spatial preservation fill technique. In this example, the launcher module 118 is configured to assign representations to groups that are utilized to specify the priority ordering that is used to arrange representations from one layout to another.

In this example, a predefined distance 702 along a dimension in the user interface is used to assign representations into groups. For example, the predefined distance 702 may correspond to a size of a display area in the application launcher 120 along the dimension, e.g., vertical in this example, such as for a first layout. As previously described, the first layout may correspond to a configuration of an application launcher 120 for another computing device and thus, when used for a new computing device may involve use of a second layout. Thus, representations above a horizontal axis 704 in the application launcher are assigned into corresponding groups 706, 708, 710.

A priority ordering is also determined for the representations within the groups. A top/down and left/right ordering is also employed. However, in this instance representations below a medium size within a predefined area are assigned consecutively, e.g., representations 2, 3, 4, 5 are below a threshold of a medium-sized representation (e.g., representation 6) and as such as treated as a single collection that is ordered consecutively as illustrated. In this way, spatial arrangement of the representations, one to another may be preserved and as such this technique may be referred to as a spatial-preservation arrangement technique as further described below.

FIG. 8 depicts an example implementation 800 in which rearrangement of group 706 from to different layouts is shown. In this example, the first layout of the group 706 as repeated from FIG. 7 employs a four medium-sized representation width. Thus, when converting over to another layout 802 that supports four medium-sized representations this other layout 802 matches the first layout. However, when converting to a layout 804 that supports fewer representations, e.g., two medium-sized representation width for groups within the layout, the priority ordering of the spatial relationship is followed such that representations 6-12 are displayed as positioned beneath representations 1-5.

Figure 9:
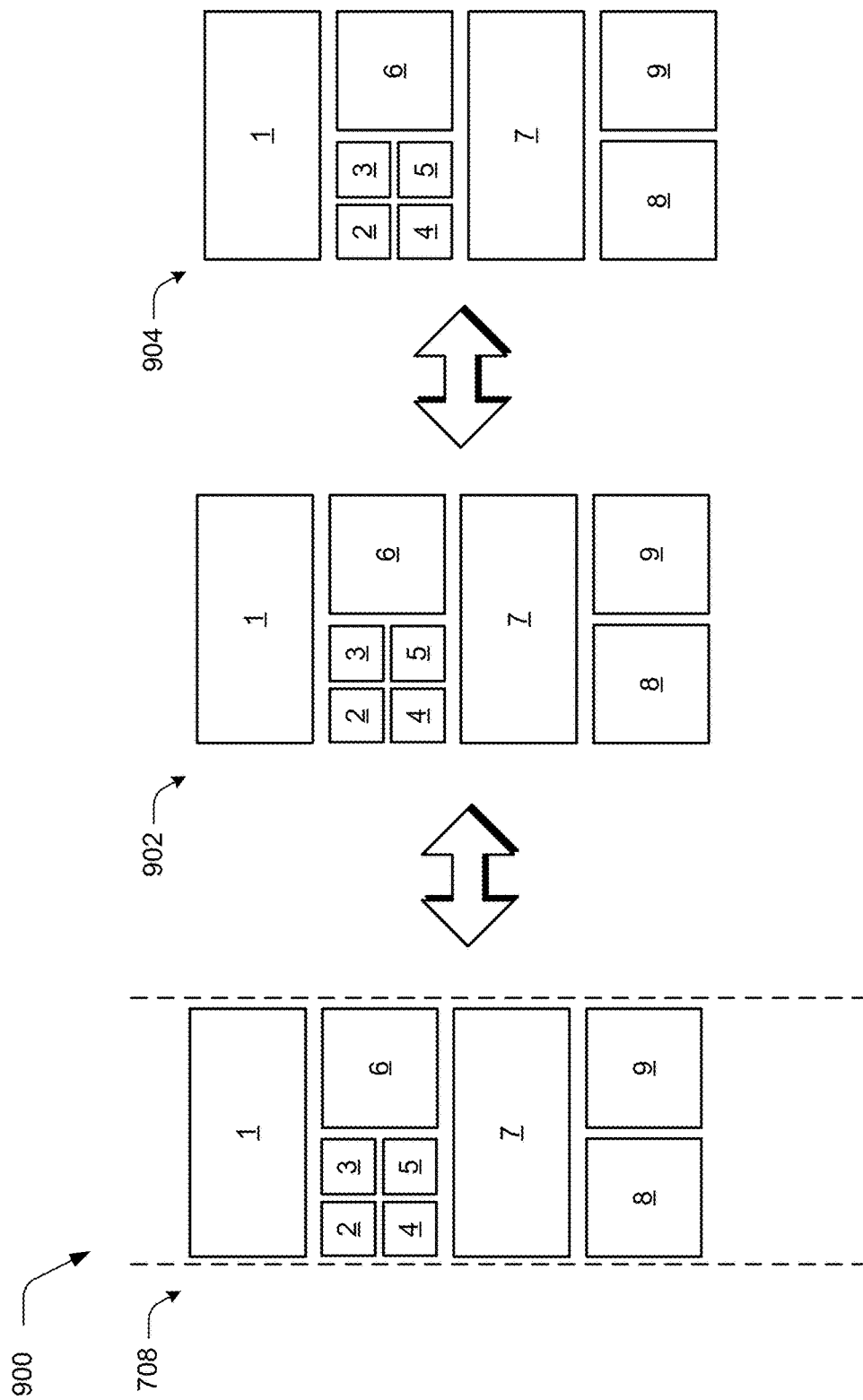

On the other hand, as shown in an example implementation 900 of FIG. 9, arrangement of representations in the first layout of group 708 is unchanged when confronted with another layout 902 that also supports four medium-sized representations and a layout 904 that supports even fewer representations, e.g., two medium-sized representation width.

Figure 10:
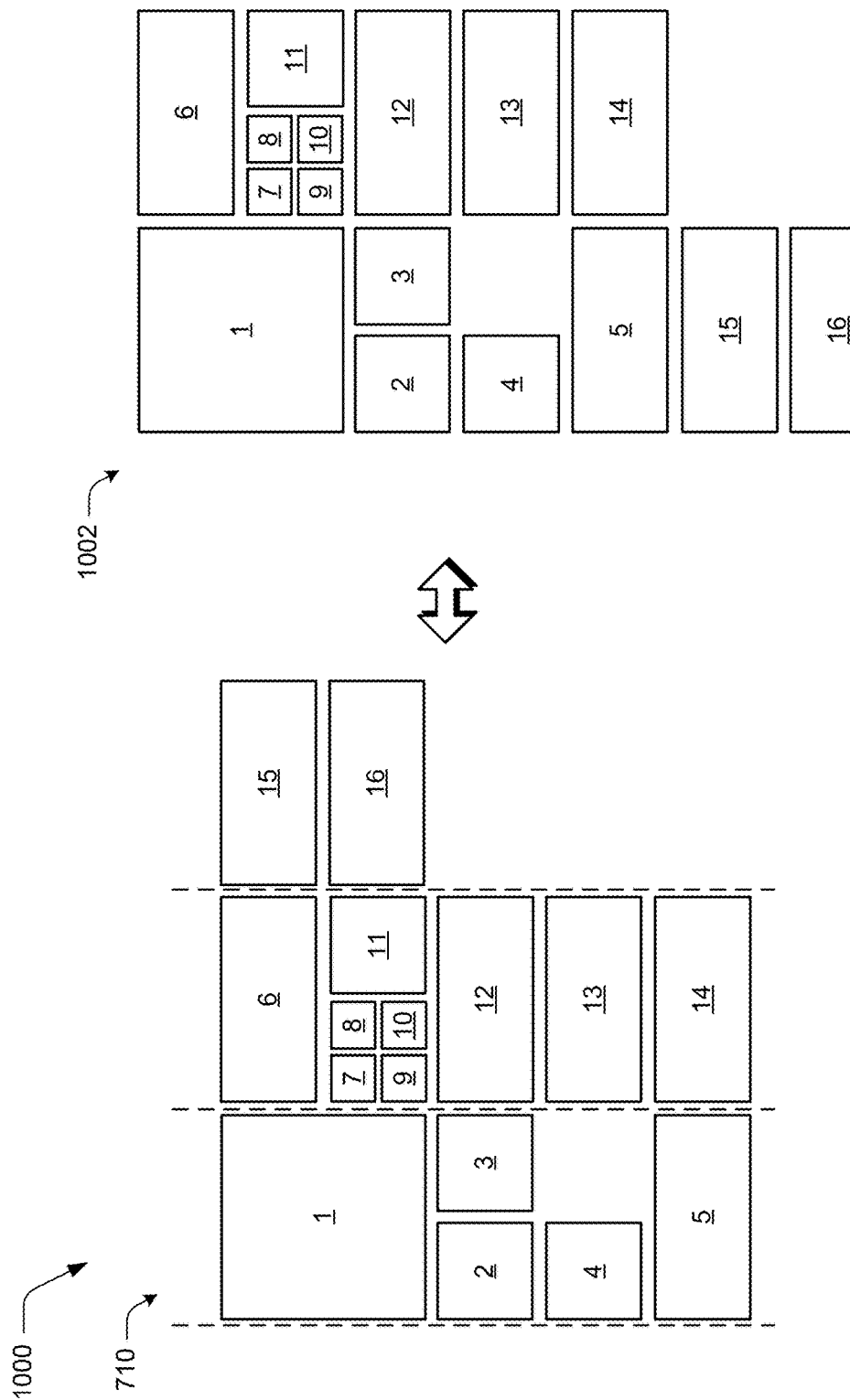
Figure 11:
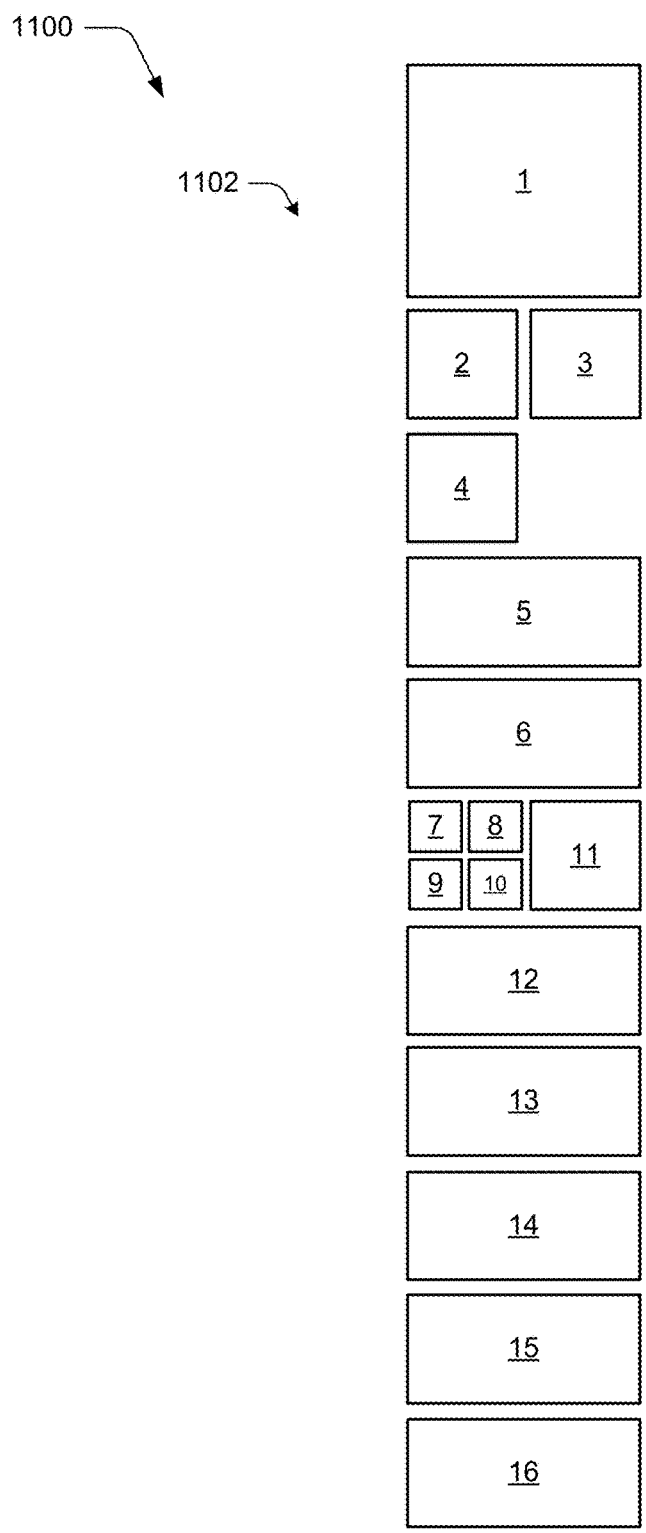

However, as shown in the example implementations 1000, 1100 of FIGS. 10 and 11, different amounts of display area available horizontally in different layouts does cause rearrangement or the representations. Group 710 is illustrated as arranged in the application launcher 120 as shown in a first layout of FIG. 7. Another layout 1002 is illustrated that supports a four medium-sized representation width in two columns. As such, representations from the layout of group 710 are rearranged into the other layout 1002 such that a spatial relationship of representations 1-14 is maintained, but representations 15 and 16 are positioned beneath representation 5. Thus, the spatial relationship of the representations is preserved in a manner that follows user expectations and thus promotes user efficiency in interaction with a user interface that employs these arrangement techniques.

Figure 7:
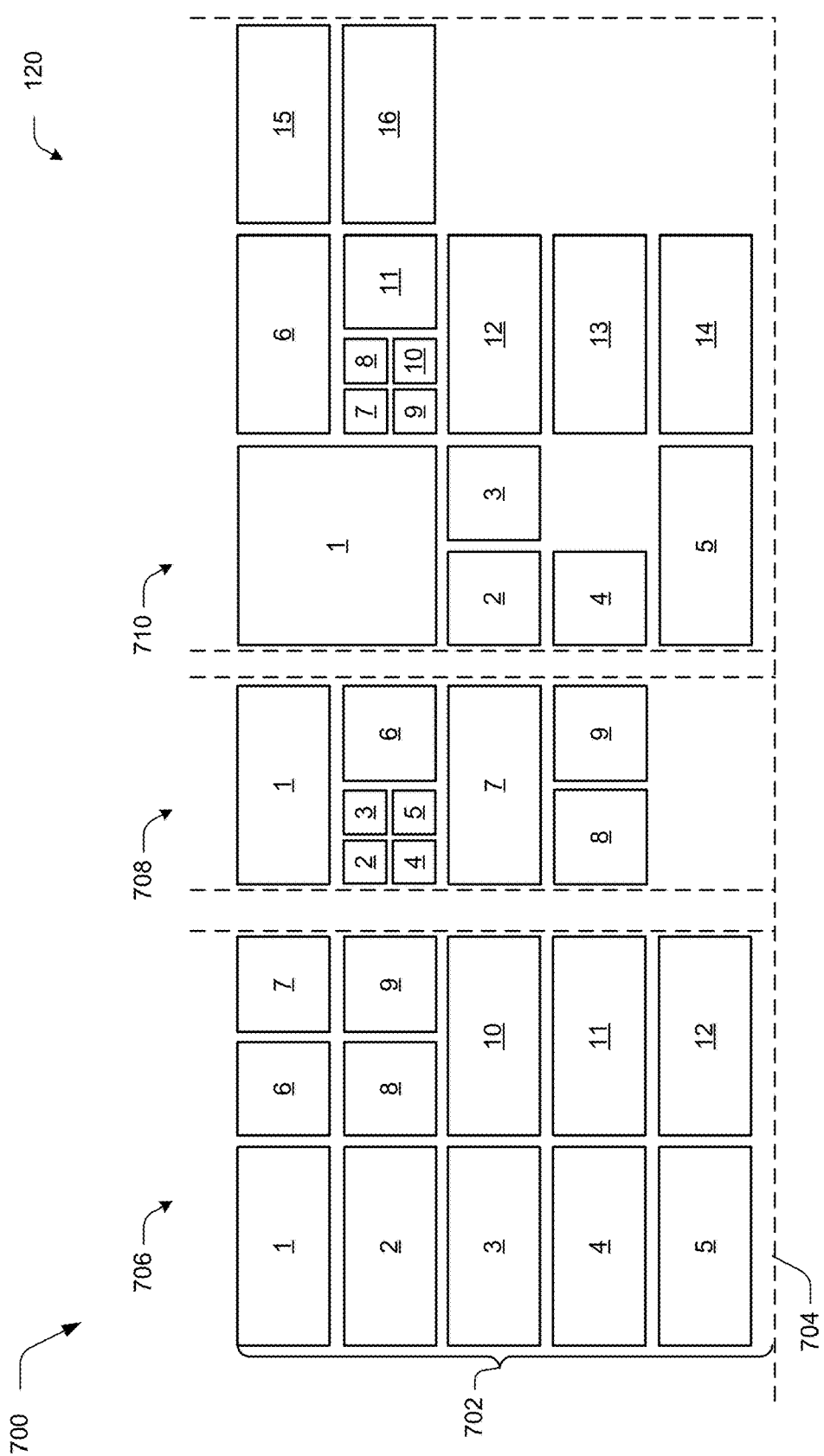
FIGS. 7-14 depicts additional example implementations of control of item arrangement in a user interface using a spatial preservation fill technique.

Likewise, group 710 as included in a layout of FIG. 7 may also be rearranged for inclusion in another layout that supports even fewer representations across the horizontal dimension, an example of which is shown in the example implementation 1100 of FIG. 11. In this example, yet another layout 1102 of the group 610 included in the layout of FIG. 7 is shown, which in this case supports horizontal rows of two medium-sized representations. Accordingly, in this example the spatial relationships are followed using the priority ordering going downward vertically.

Figure 12:
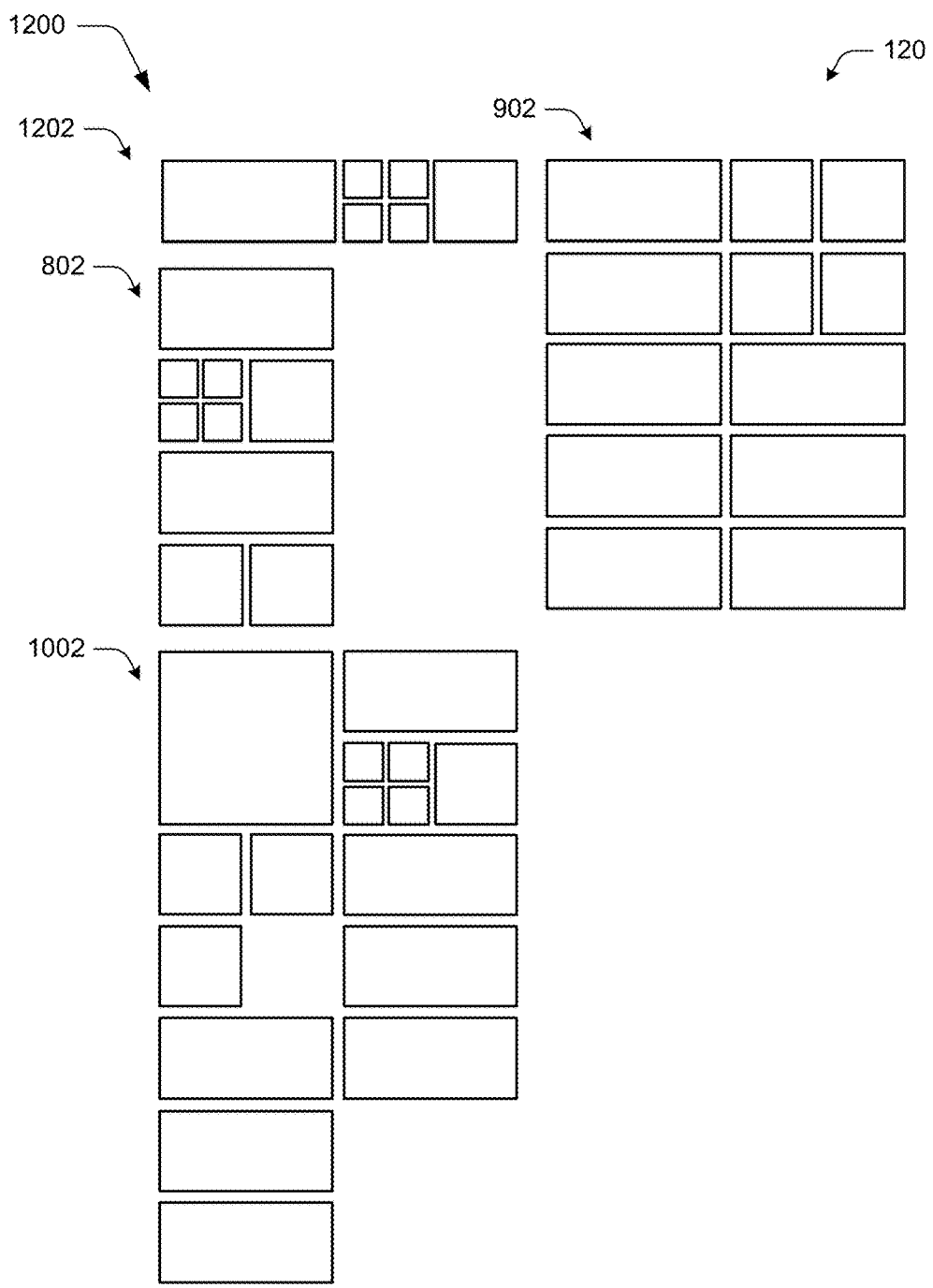

FIG. 12 depicts an example implementation 1200 showing an application launcher 120 as including groups in a layout that support a width of four medium sized representations having two linear arrangements of groups. In this example, the application launcher 120 involves an update to include a new group 1202 of representations as part of the new layout. Representations from the application launcher 120 of FIG. 7 are then added to the application launcher 120 in a manner that balances preservation of the spatial relationship of FIG. 7 and minimization of a display area of the user interface consumed by the groups.

The other layout 802 of group 706 from FIG. 8 that corresponds to a four medium-sized width is placed beneath the new group 1202. This preserves the spatial relationship of the representations within the group. Likewise the other layout 902 of group 708 from FIG. 9 is also added to the application launcher 120, in this instance to the right of the layout 802 of group 706. In this way, a spatial relationship between the layouts 802, 902 of the groups 706, 708 is also preserved from the first layout of FIG. 7.

The layout 1002 of group 710 is also added to the application launcher 120. In this instance, the application launcher 120 supports vertical scrolling and is limited to two linear arrangements of groups. Thus, the layout 1002 of group 710 from FIG. 10 is positioned beneath the layout 802 of group 706 from FIG. 7 in the application launcher 120. As such, a spatial relationship of the representations within the layout 1002 of group 710 is preserved to the extent possible as previously described in relation to FIG. 10 in an intuitive manner in which a client is readily able to determine "where to look" to locate group 710 and the representations included therein.

Figure 13:
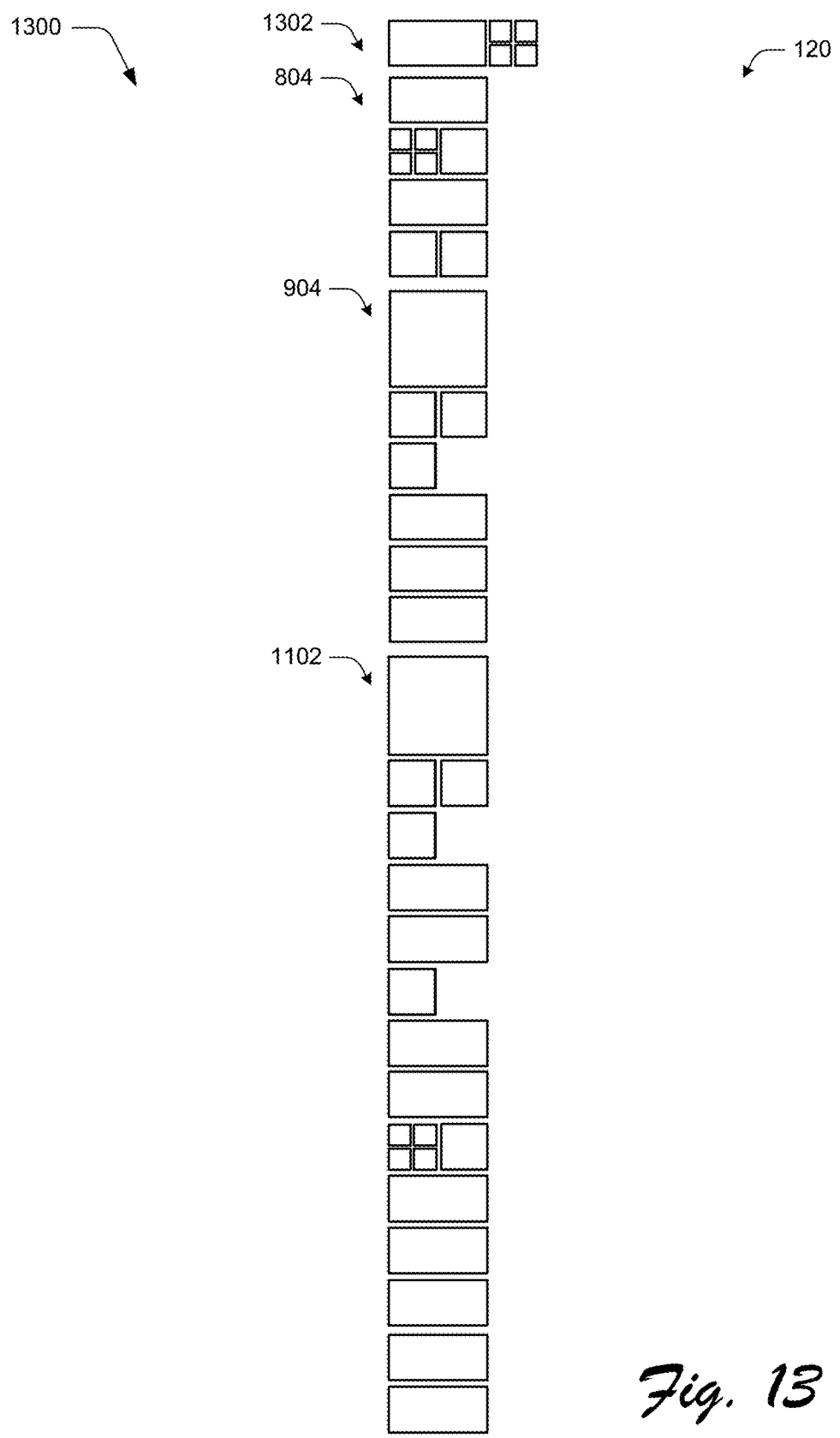

FIG. 13 depicts an example implementation 1300 showing an application launcher 120 as including groups in a layout that supports a width of two medium sized representations having a single linear arrangements of groups. Like the example of FIG. 12, the application launcher 120 involves an update to include a new group 1302 of representations. Representations from the application launcher 120 of FIG. 7 are then added to the application launcher 120 in a manner that preserves the spatial relationship.

The other layout 804 of group 706 from FIG. 8 that corresponds to a two medium-sized width is placed beneath the new group 1302. This preserves the spatial relationship of the representations within the group. Likewise the other layout 904 of group 708 from FIG. 9 is also added to the application launcher 120, in this instance beneath the layout 804 of group 706. In this way, a spatial relationship between the layouts 802, 902 of the groups 706, 708 is also preserved from the first layout of FIG. 7.

The layout 1102 of group 710 from FIG. 11 is also added to the application launcher 120. In this instance, the application launcher 120 supports vertical scrolling and is limited to single linear arrangements of groups. Thus, the layout 1002 of group 710 from FIG. 10 is positioned beneath the layout 904 of group 708 in the application launcher 120. Thus, a spatial relationship of the representations within the layout 1102 of group 710 is preserved to the extent possible as previously described in relation to FIG. 11 in an intuitive manner in which a user is readily able to determine "where to look" to locate group 710 and the representations included therein.

Figure 14:
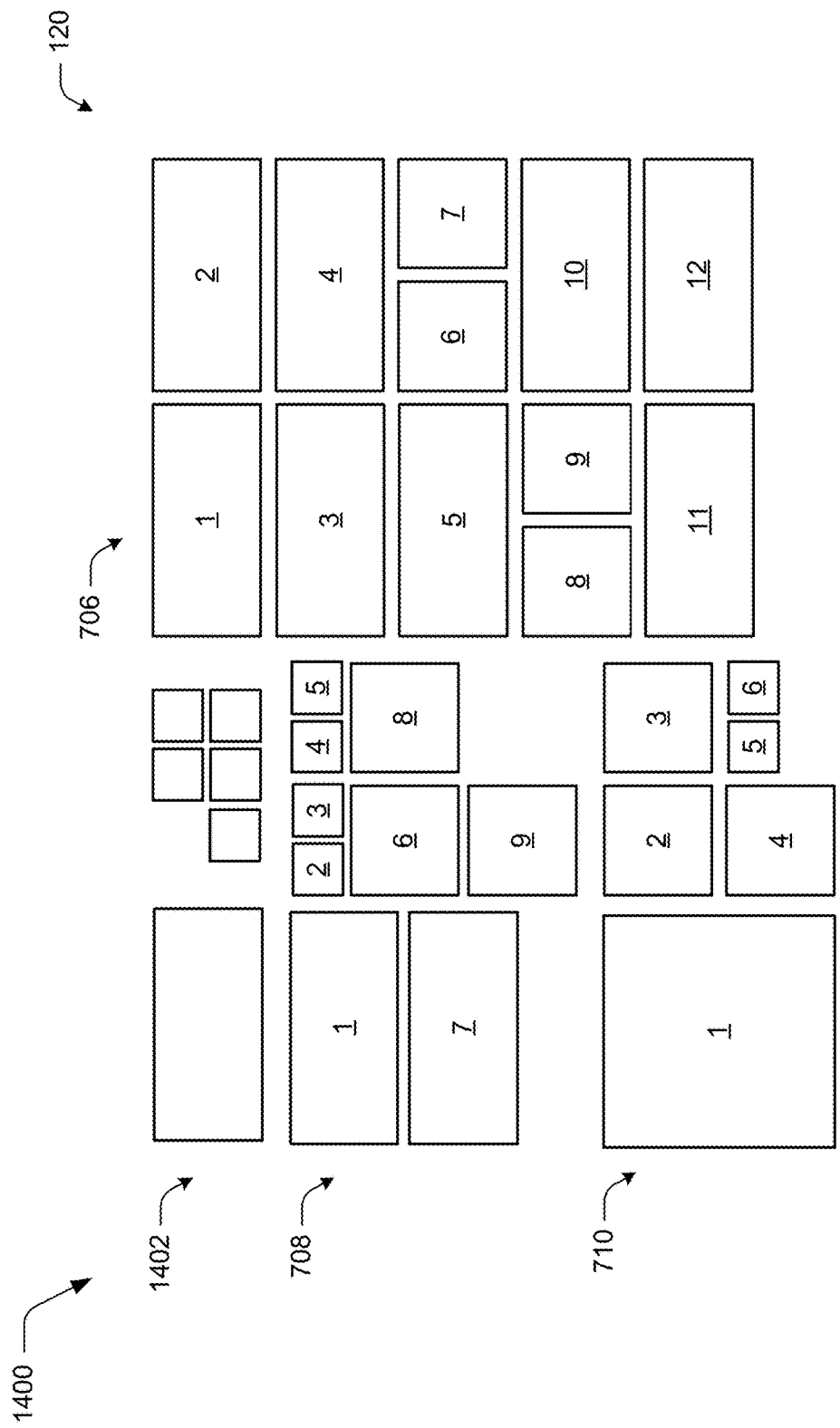

FIG. 14 depicts an example implementation 1400 of another ordered fill technique that is utilized to control positioning of representations within an application launcher 120 or other items in a user interface. In this example, a first layout of FIG. 7 is rearranged into another layout that supports eight medium-sized representations. The representations are arranged by placement of items (e.g., the representations) in a first location in the application launcher 120 at which the items fit. Thus, in this example the existence of gaps is also minimized.

For example, a new group 1402 is added as before as part of the transition from the first layout of FIG. 7 to this layout. A top/down and left-to-right order is used within the groups to specify placement of representations within the groups.

Thus, arrangement of representations within group 706 fills in rows from left to right evenly as the representations have matching heights.

In group 708, however, representations 2-5 have a lesser height than representations 1 and 7-9 and thus result in a staggered relationship of the representations, one to another, that minimizes an amount of display area consumed by the group 708. Likewise, group 710 includes representations having different heights and are placed in order.

Figure 15:
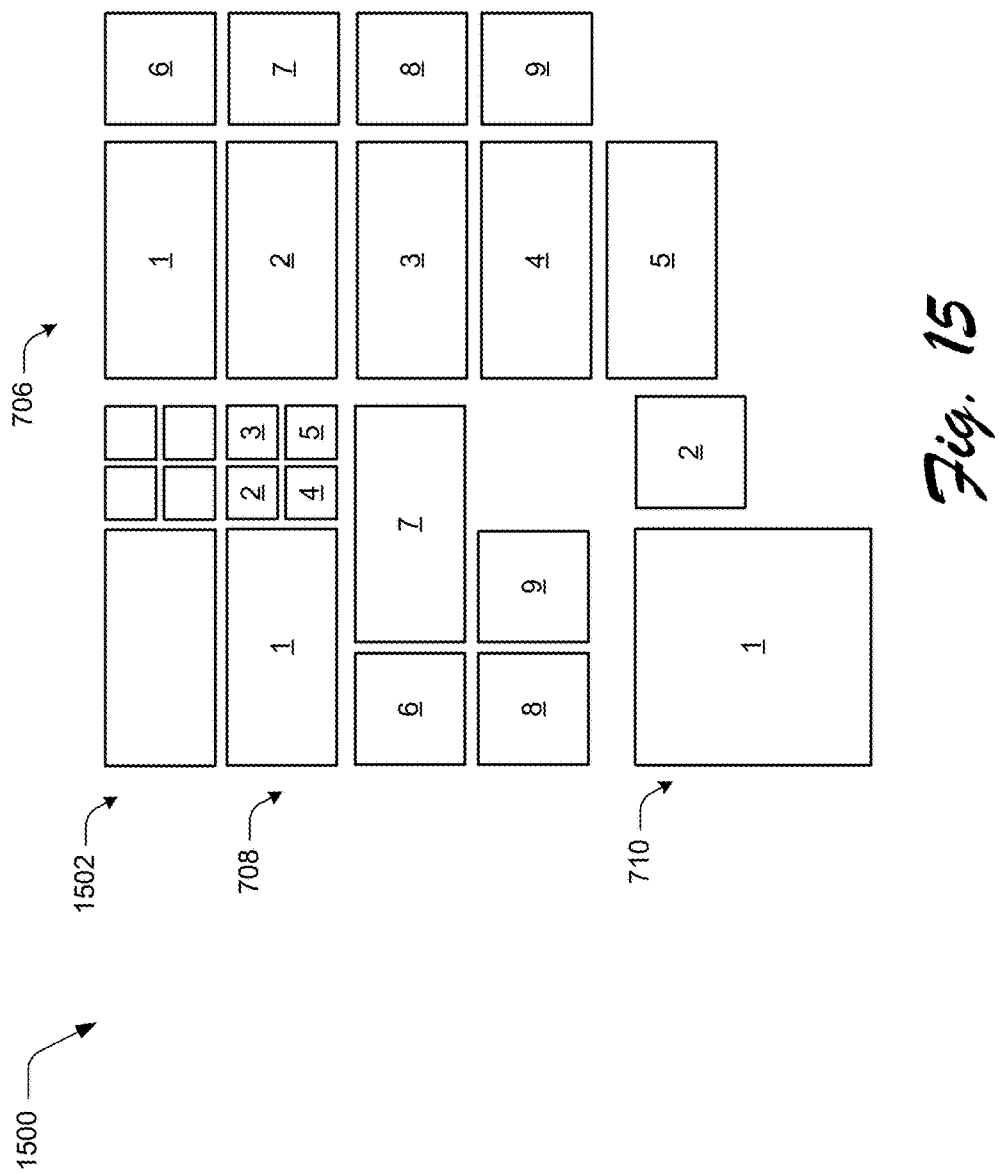
FIG. 15 depicts another example implementation of another ordered fill technique that is utilized to control positioning of representations within an application launcher or other items in a user interface.

FIG. 15 depicts another example implementation 1500 of an ordered fill technique that is utilized to control positioning of representations within an application launcher 120 or other items in a user interface. In this example, a first layout of FIG. 7 is rearranged into another layout that support six medium-sized representations. The control is performed by placement of items (e.g., the representations) in a first location in the application launcher 120 at which the items fit. Thus, in this example the existence of gaps is also minimized.

A new group 1502 is also added as before as part of the transition from the first layout of FIG. 7 to this layout. A top/down and left-to-right order is used within the groups to specify placement of representations within the groups. Thus, arrangement of representations within group 706 fills in rows from left first to include representations 1-5 in separate rows as these representations are too large to fit multiple instances in a single row. Representations 6-9 then fill in the gaps in the above rows, thereby minimizing an amount of display area consumed by the group 706.

In group 708, even though representations 2-5 have a lesser height than representations 1 and 7-9, the ordered priority of the representations results in a fill of the group 708 without gaps. Group 710 includes representations having different heights and are placed in order. Thus, in both of these examples the ordered fill may be used to minimize gaps and follow a priority ordering of the representations, further discussion of which is described in relation to the following procedures.

Example Procedures

The following discussion describes application launcher techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment described above.

Functionality, features, and concepts described in relation to the examples of FIGS. 1-15 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

FIG. 16 depicts a procedure 1600 in an example implementation in which intuitive rearrangement of items in a user interface is caused by a computing device using an ordered fill technique. A priority ordering of items, one to another, is determined that is specified for display of the items in a first layout in a user interface of the computing device. The items are assigned into respective ones of a plurality of groups that together compose one or more linear arrangements of the groups (block 1602). As shown in FIG. 4, for instance, representations are arranged into groups 402, 404, 406, 408 and a priority ordering is specified based on arrangement in relation to one or more dimensions, e.g., to the top/left of the application launcher 120.

Arrangement of the items is controlled by the computing device for display in a second layout in the user interface that is different from the first layout by an amount of display area available in the user interface along one or more dimensions. The control includes following the priority ordering of the items to select positions of the items within respective groups based on availability of an open area that is available to fit a display of a respective item within the group and that minimizes a display area consumed by the group in the user interface (block 1604). As shown in FIGS. 5 and 6, the ordered fill technique may be used in this example to place items (e.g., the representations) in the groups according to the order at a position furthest in a desired direction that is available to fit the item, e.g., closest to the top in this example.

FIG. 17 depicts a procedure 1700 in an example implementation in which in which intuitive rearrangement of items in a user interface is caused by a computing device using a spatial preservation fill technique. A priority ordering of items is determined, one to another, that is specified for display of the items in a first layout in a user interface of the computing device. The priority ordering of the items is performed by assigning the items into respective groups that are based on a predefined distance in the user interface along one or more dimensions (block 1702). As shown in FIG. 7, groups 706, 708, 710 are formed from items (e.g., representations) that are within a predefined distance 702 in the user interface. A priority ordering is then formed based on these representations, such as by using the same techniques as described above to order items within the groups.

Arrangement of the items is controlled by the computing device for display in a second layout in the user interface that is different from the first layout. The control includes following the priority ordering of the items to select positions of the items based on availability of an open area that is available to fit a display of a respective item (block 1704). As shown in FIGS. 12 and 13, for instance, different amount of display area along a horizontal dimension result in different layouts of the representations within the groups formed in the previous step. A variety of other examples are also contemplated as previously described.

Example System and Device

Figure 18:
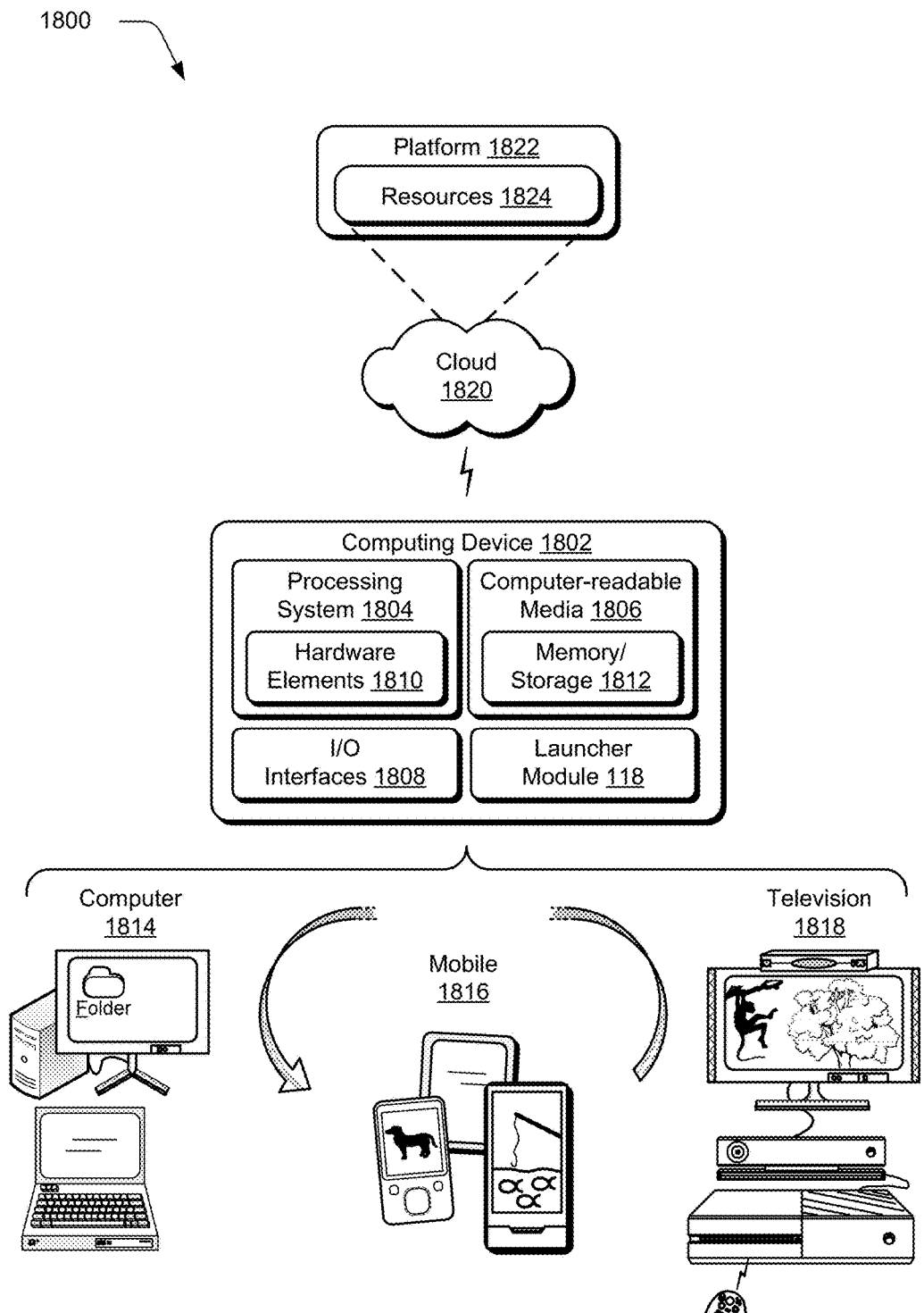
FIG. 18 illustrates various components of an example device that can be implemented as any type of computing device as described with reference to FIGS. 1-17 to implement embodiments of the techniques described herein.

FIG. 18 illustrates an example system generally at 1800 that includes an example computing device 1802 that is representative of one or more computing systems and/or devices that may implement the various techniques described herein as shown through inclusion of the launcher module 118. The computing device 1802 may be, for example, a server of a service provider, a device associated with a client (e.g., a client device), an on-chip system, and/or any other suitable computing device or computing system.

The example computing device 1802 as illustrated includes a processing system 1804, one or more computer-readable media 1806, and one or more I/O interface 1808 that are communicatively coupled, one to another. Although not shown, the computing device 1802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1804 is representative of functionality to perform one or more operations using hardware. Accordingly, the processing system 1804 is illustrated as including hardware element 1810 that may be configured as processors, functional blocks, and so forth. This may include implementation in hardware as an application specific integrated circuit or other logic device formed using one or more semiconductors. The hardware elements 1810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1806 is illustrated as including memory/storage 1812. The memory/storage 1812 represents memory/storage capacity associated with one or more computer-readable media. The memory/storage component 1812 may include volatile media (such as random access memory (RAM)) and/or nonvolatile media (such as read only memory (ROM), Flash memory, optical disks, magnetic disks, and so forth). The memory/storage component 1812 may include fixed media (e.g., RAM, ROM, a fixed hard drive, and so on) as well as removable media (e.g., Flash memory, a removable hard drive, an optical disc, and so forth). The computer-readable media 1806 may be configured in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1810 and computer-readable media 1806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1810. The computing device 1802 may be configured to implement particular instructions and/or functions corresponding to the software and/or hardware modules. Accordingly, implementation of a module that is executable by the computing device 1802 as software may be achieved at least partially in hardware, e.g., through use of computer-readable storage media and/or hardware elements 1810 of the processing system 1804. The instructions and/or functions may be executable/operable by one or more articles of manufacture (for example, one or more computing devices 1802 and/or processing systems 1804) to implement techniques, modules, and examples described herein.

As further illustrated in FIG. 18, the example system 1800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1802 may assume a variety of different configurations, such as for computer 1814, mobile 1816, and television 1818 uses. Each of these configurations includes devices that may have generally different constructs and capabilities, and thus the computing device 1802 may be configured according to one or more of the different device classes. For instance, the computing device 1802 may be implemented as the computer 1814 class of a device that includes a personal computer, desktop computer, a multi-screen computer, laptop computer, netbook, and so on.

The computing device 1802 may also be implemented as the mobile 1816 class of device that includes mobile devices, such as a mobile phone, portable music player, portable gaming device, a tablet computer, a multi-screen computer, and so on. The computing device 1802 may also be implemented as the television 1818 class of device that includes devices having or connected to generally larger screens in casual viewing environments. These devices include televisions, set-top boxes, gaming consoles, and so on.

The techniques described herein may be supported by these various configurations of the computing device 1802 and are not limited to the specific examples of the techniques described herein. This functionality may also be implemented all or in part through use of a distributed system, such as over a "cloud" 1820 via a platform 1822 as described below.

The cloud 1820 includes and/or is representative of a platform 1822 for resources 1824. The platform 1822 abstracts underlying functionality of hardware (e.g., servers) and software resources of the cloud 1820. The resources 1824 may include applications and/or data that can be utilized while computer processing is executed on servers that are remote from the computing device 1802. Resources 1824 can also include services provided over the Internet and/or through a subscriber network, such as a cellular or Wi-Fi network.

The platform 1822 may abstract resources and functions to connect the computing device 1802 with other computing devices. The platform 1822 may also serve to abstract scaling of resources to provide a corresponding level of scale to encountered demand for the resources 1824 that are implemented via the platform 1822. Accordingly, in an interconnected device embodiment, implementation of functionality described herein may be distributed throughout the system 1800. For example, the functionality may be implemented in part on the computing device 1802 as well as via the platform 1822 that abstracts the functionality of the cloud 1820.

Conclusion and Example Implementations

Example implementations described herein include, but are not limited to, one or any combinations of one or more of the following examples:

In one or more examples, intuitive rearrangement of items in a user interface is caused by a computing device. A priority ordering of items, one to another, is determined that is specified for display of the items in a first layout in a user interface of the computing device. The items are assigned into respective ones of a plurality of groups that together compose one or more linear arrangements of the groups. Arrangement of the items is controlled by the computing device for display in a second layout in the user interface that is different from the first layout by an amount of display area available in the user interface along one or more dimensions. The control includes following the priority ordering of the items to select positions of the items within respective groups based on availability of an open area that is available to fit a display of a respective item within the group and that minimizes a display area consumed by the group in the user interface.

An example in combination with one or more of the examples listed herein, in which the items are representations of applications or content within an application launcher.

An example in combination with one or more of the examples listed herein, in which the items are included as part of a dynamically linked list.

An example in combination with one or more of the examples listed herein, in which the controlling includes determining that an open area is not available to fit a display of a respective said item one or more existing rows or columns with the group and responsive to the determining adding a row or column within the group to position the respective said item.

An example in combination with one or more of the examples listed herein, in which the difference in the amount of display area available in the user interface along the one or more dimensions in the first and second layouts causes a corresponding difference in an amount of display area available in the user interface along the one or more dimensions within one or more of the groups.

An example in combination with one or more of the examples listed herein, in which the first layout has a different number of available rows or columns within the groups that in the second layout.

An example in combination with one or more of the examples listed herein, in which the items have a plurality of different sizes, one to another.

An example in combination with one or more of the examples listed herein, in which the determining the priority ordering of the items includes determining a priority ordering of the groups and the items within the groups.

In one or more examples, intuitive rearrangement of items in a user interface is caused by a computing device. A priority ordering of items is determined, one to another, that is specified for display of the items in a first layout in a user interface of the computing device. The priority ordering of the items is performed by assigning the items into respective groups that are based on a predefined distance in the user interface along one or more dimensions. Arrangement of the items is controlled by the computing device for display in a second layout in the user interface that is different from the first layout. The control includes following the priority ordering of the items to select positions of the items based on availability of an open area that is available to fit a display of a respective item and that minimizes a display area consumed by a corresponding group, to which, the respective item is assigned in the user interface.

An example in combination with one or more of the examples listed herein, in which the items are representations of applications or content within an application launcher.

An example in combination with one or more of the examples listed herein, in which the items are included as part of a dynamically linked list.

An example in combination with one or more of the examples listed herein, in which the controlling includes determining that an open area is not available to fit a display of a respective said item one or more existing rows or columns and responsive to the determining adding a row or column to position the respective said item.

An example in combination with one or more of the examples listed herein, in which the first layout has a different number of available rows or columns that in the second layout.

An example in combination with one or more of the examples listed herein, in which the items have a plurality of different sizes, one to another.

An example in combination with one or more of the examples listed herein, in which the determining the priority ordering of the items includes determining a priority ordering of the assigned groups and the items within the assigned groups.

In one or more examples, a computing device includes a processing system configured to execute one or more instructions and computer-readable storage media comprising one or more instructions that cause execution of the processing system to implement an operating system that includes an application launcher. The application launcher has a plurality of representations of applications or content that are selectable to navigate to a user interface corresponding with a respective application or content. The operating system is configured to perform operations including determination of a priority ordering of the representations, one to another, that is specified for display of the representations in a first layout of the application launcher. The operations also include control of arrangement of the items by the computing device for display in a second layout in the application launcher that is different from the first layout by an amount of display area available in the application launcher along one or more dimensions. The controlling includes following the priority ordering of the representations to select positions of the representations based on availability of an open area in the application launcher that is available to fit a display of a respective item and that minimizes a display area consumed by the representations within the application launcher.

An example in combination with one or more of the examples listed herein, in which the controlling includes determining that an open area is not available to fit a display of a respective said representation into one or more existing rows or columns and responsive to the determining adding a row or column to position the respective said representation.

An example in combination with one or more of the examples listed herein, in which the first layout has a different number of available rows or columns that in the second layout.

An example in combination with one or more of the examples listed herein, in which the representations have a plurality of different sizes, one to another.

An example in combination with one or more of the examples listed herein, in which the determining the priority ordering of the items includes determining a priority ordering of groups that contain the representations and the representation within the groups.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method of causing intuitive rearrangement of items in a user interface of a computing device, the method comprising:

determining a priority ordering of items, one to another, that is specified for display of the items in a first layout in a user interface of the computing device, the items assigned into respective ones of a plurality of groups that together compose one or more linear arrangements of the groups, wherein at least one of the plurality of groups comprises rows and columns, wherein the priority ordering defines in the first layout an ordered list of items within the ones of the plurality of groups, which orders items within the respective ones of the plurality of groups starting with items placed at the closest position to the top of the user interface and continuing with items placed at a position further from the top of the user interface, the top of the user interface being the top side of the user interface in the view of a user; and responsive to the user changing an orientation of the computing device from a portrait to a landscape view, controlling arrangement of the items by the computing device for display in a second layout in the user interface that is different from the first layout by an amount of display area available in the user interface along one or more dimensions, the controlling including following the priority ordering of the items to select positions of the items within respective groups near the top of the user interface, based on availability of an open area that is available to fit a display of a respective said item within the group and by minimizing a display area consumed by the group in the user interface, wherein each item has a known display size, and, at least one item having a smaller display size and a lower priority is arranged in a higher priority order than another item having a larger display size and a higher priority.

2. A method as described in claim 1, wherein the items are representations of applications or content within an application launcher.

3. A method as described in claim 1, wherein the items are included as part of a dynamically linked list.

4. A method as described in claim 1, wherein the controlling includes determining that an open area is not available to fit a display of a respective said item into one or more existing rows or columns with the group and responsive to the determining adding a row or column within the group to position the respective said item.

5. A method as described in claim 1, wherein the difference in the amount of display area available in the user interface along the one or more dimensions in the first and second layouts causes a corresponding difference in an amount of display area available in the user interface along the one or more dimensions within one or more of the groups.

6. A method as described in claim 1, wherein the first layout has a different number of available rows or columns within the groups than in the second layout.

7. A method as described in claim 1, wherein the items have a plurality of different sizes, one to another.

8. A method as described in claim 1, wherein the determining the priority ordering of the items includes determining a priority ordering of the groups and the items within the groups.

9. A computing device comprising:

a processing system configured to execute one or more instructions; and computer-readable storage media comprising one or more instructions that cause execution of the processing system to implement an operating system that includes an application launcher, the application launcher having a plurality of representations of applications or content that are selectable to navigate to a user interface corresponding with a respective said application or content, the operating system configured to perform operations comprising:

determining a priority ordering of the representations, one to another, that is specified for display of the representations in a first layout of the application launcher, the representations assigned into respective ones of a plurality of groups that together compose one or more linear arrangements of the groups, wherein at least one of the plurality of groups comprises rows and columns, wherein the priority ordering defines in the first layout an ordered list of representations within the ones of the plurality of groups, which orders representations within the respective ones of the plurality of groups starting with representations placed at the closest position to the top of the user interface and continuing with representations placed at a position further from the top of the user interface, the top of the user interface being the top side of the user interface in the view of a user; and responsive to the user changing an orientation of the computing device from a portrait to a landscape view, controlling arrangement of the representations by the computing device for display in a second layout in the application launcher that is different from the first layout by an amount of display area available in the application launcher along one or more dimensions, the controlling including following the priority ordering of the representations to select positions of the representations within respective groups near the top of the user interface based on availability of an open area in the application launcher that is available to fit a display of a respective said representation and by minimizing a display area consumed by the representations within the application launcher, wherein each representation has a known display size, and, at least one representation having a smaller display size and a lower priority is arranged in a higher priority order than another representation having a larger display size and a higher priority.

10. A computing device as described in claim 9, wherein the controlling includes determining that an open area is not available to fit a display of a respective said representation into one or more existing rows or columns and responsive to the determining adding a row or column to position the respective said representation.

11. A computing device as described in claim 9, wherein the first layout has a different number of available rows or columns than in the second layout.

12. A computing device as described in claim 9, wherein the representations have a plurality of different sizes, one to another.

13. A computing device as described in claim 9, wherein the determining the priority ordering of the representations includes determining a priority ordering of groups that contain the representations and the representation within the groups.

14. A computer-readable storage media storing computer-readable instructions that when executed cause a computing device to:
    determine a priority ordering of items, one to another, that is specified for display of the items in a first layout in a user interface of the computing device, the items assigned into respective ones of a plurality of groups that together compose one or more linear arrangements of the groups, wherein at least one of the plurality of groups comprises rows and columns, wherein the priority ordering defines in the first layout an ordered list of items within the ones of the plurality of groups, which orders items within the respective ones of the plurality of groups starting with items placed at the closest position to the top of the user interface and continuing with items placed at a position further from the top of the user interface, the top of the user interface being the top side of the user interface in the view of a user; and
    responsive to the user changing an orientation of the computing device from a portrait to a landscape view, control arrangement of the items by the computing device for display in a second layout in the user interface that is different from the first layout by an amount of display area available in the user interface along one or more dimensions, the control including following the priority ordering of the items to select positions of the items within respective groups near the top of the user interface, based on availability of an open area that is available to fit a display of a respective said item within the group and by minimizing a display area consumed by the group in the user interface, wherein each item has a known display size, and, at least one item having a smaller display size and a lower priority is arranged in a higher priority order than another item having a larger display size and a higher priority.

15. The computer-readable storage media of claim 14, wherein the items are representations of applications or content within an application launcher.

16. The computer-readable storage media of claim 14, wherein the items are included as part of a dynamically linked list.

17. The computer-readable storage media of claim 14, wherein the control includes determining that an open area is not available to fit a display of a respective said item into one or more existing rows or columns with the group and responsive to the determining adding a row or column within the group to position the respective said item.

18. The computer-readable storage media of claim 14, wherein the difference in the amount of display area available in the user interface along the one or more dimensions in the first and second layouts causes a corresponding difference in an amount of display area available in the user interface along the one or more dimensions within one or more of the groups.

19. The computer-readable storage media of claim 14, wherein the first layout has a different number of available rows or columns within the groups than in the second layout.

20. The computer-readable storage media of claim 14, wherein the items have a plurality of different sizes, one to another.

* * * * *